US012737560B2

(12) United States Patent
Chollampatt Muhammed Ashraf et al.

(10) Patent No.: US 12,737,560 B2
(45) Date of Patent: Sep. 15, 2026

(54) DISTILLING LANGUAGE MODELS

(71) Applicant: Zoom Video Communications, Inc., San Jose, CA (US)

(72) Inventors: Shamil Chollampatt Muhammed Ashraf, Singapore (SG); Sathish Reddy Indurthi, Cupertino, CA (US); Minh-Quang Pham, Karlsruhe (DE); Marco Turchi, Pergine Valsugana (IT)

(73) Assignee: Zoom Communications, Inc., San Jose, CA (US)

( * ) Notice: Subject to any disclaimer, the term of this patent is extended or adjusted under 35 U.S.C. 154(b) by 55 days.

(21) Appl. No.: 18/743,807

(22) Filed: Jun. 14, 2024

(65) Prior Publication Data

US 2024/0419923 A1 Dec. 19, 2024

Related U.S. Application Data

(60) Provisional application No. 63/521,285, filed on Jun. 15, 2023.

(51) Int. Cl.
*G06F 40/40* (2020.01)
*G06F 40/169* (2020.01)

(52) U.S. Cl.
CPC ............ *G06F 40/40* (2020.01); *G06F 40/169* (2020.01)

(58) Field of Classification Search
CPC ............................... G06F 10/40; G06F 40/169
See application file for complete search history.

(56) References Cited

U.S. PATENT DOCUMENTS

| | | | | |
|---|---|---|---|---|
| 2023/0070497 | A1* | 3/2023 | McInerney | G06F 40/30 |
| 2023/0401382 | A1* | 12/2023 | Hombaiah | G06N 3/088 |
| 2023/0419017 | A1* | 12/2023 | Fabbri | G06F 40/166 |
| 2024/0111969 | A1* | 4/2024 | Glass | G06F 40/56 |
| 2024/0168984 | A1* | 5/2024 | Kim | G06F 16/3347 |
| 2024/0354789 | A1* | 10/2024 | Garvey | G06N 20/00 |
| 2024/0403339 | A1* | 12/2024 | Azizi | G06F 40/30 |

OTHER PUBLICATIONS

EP International Search Report and Written Opinion for PCT/US2024/034044 mailed Sep. 10, 2024.

Joachimiak et al., "Gene Set Summarization Using Large Language Models", arXiv, May 25, 2022; pp. 1-26.

* cited by examiner

*Primary Examiner* — Kevin Ky
(74) *Attorney, Agent, or Firm* — Kilpatrick Townsend & Stockton LLP

(57) ABSTRACT

One example method includes selecting an entry from a validation set based on similarity to a first communication record, wherein the entry from the validation set includes a second communication record and a corresponding summary of the second communication record; generating a prompt that includes the first communication record, the second communication record, and the corresponding summary of the second communication record; inputting the prompt to a first language model to obtain a generated summary of the first communication record; and training a second language model based on the first communication record and the generated summary.

20 Claims, 8 Drawing Sheets

DISTILLING LANGUAGE MODELS

CROSS-REFERENCE TO RELATED APPLICATIONS

This application claims priority to U.S. Provisional Patent Application 63/521,285, titled "Distilling Language Models for Summarization," filed Jun. 15, 2023, the entirety of which is incorporated herein by reference.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
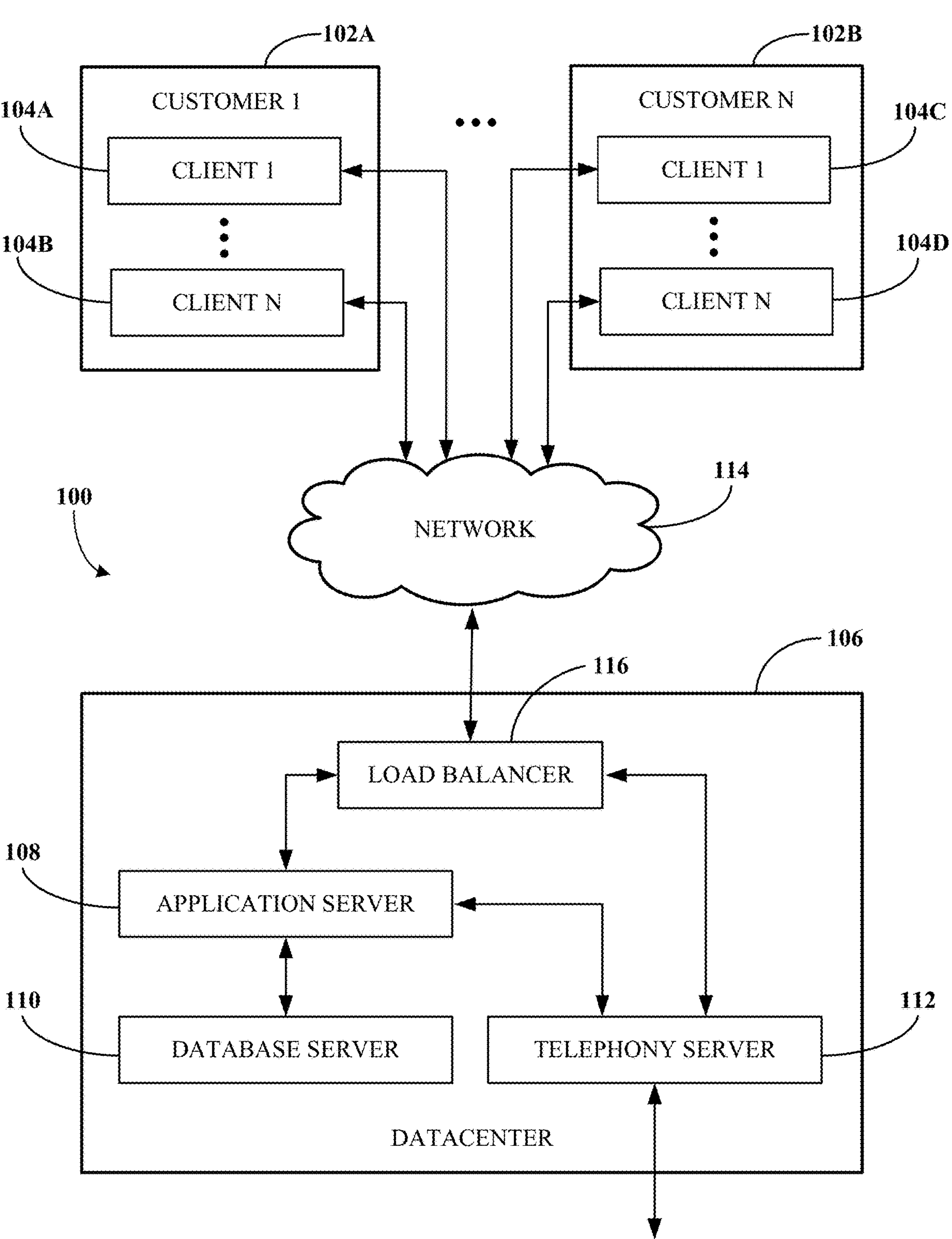
FIG. 1 is a block diagram of an example of an electronic computing and communications system suitable for use with example systems and methods for distilling language models according to this disclosure.

Examples are described herein in the context of distilling language models. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application— and business-related constraints, and that these specific goals will vary from one implementation to another and from one developer to another.

Large language models ("LLMs") are becoming more widely used as tools to perform various generative tasks, such as generating responses to user questions or generating content at a user's request, like a drafting an email. However, LLMs like ChatGPT can be expensive to train, deploy, and use for specific natural language generation tasks such as text summarization and for certain domains. In particular, LLMs can require tremendous computing resources to store and run, which in turn requires large amounts of power. Thus, creating smaller language models ("LMs") that can perform at least some of the functionality available from a full LLM would provide opportunities to enable lower-resource costs to maintain and run these smaller LMs, while retaining desired generative capabilities.

One approach is to fine-tune smaller LMs on a particular task by providing it with high-quality datasets for that task. However, obtaining suitable training datasets is difficult because large quantities of training data may still be required. Thus, there remain obstacles to training and deploying smaller LMs to perform targeted generative functionality, such as generating summaries of longer text.

To provide a suitable training dataset for a smaller LM, a large corpus of candidate training data can be gathered. The training data is of the type that would be expected to be used by the LM once it has been trained. For example, a smaller LM may be trained to summarize longer texts, such as meeting transcripts, chat discussions, or other communication records. Suitable training data might then include examples of some or all of these types of communication records.

Once a corpus of potential training data has been identified, a sequence of selecting, prompting, and filtering may be used to employ a trained LLM to generate a training dataset for a smaller LM. But first, a precursor step of generating a validation dataset may first be performed.

The validation dataset includes a relatively small number of communication records and corresponding summaries. The communication records may have been specifically selected as being representative of the types of communication records likely to be used as input to the LM, once it has been trained. The summaries may be generated by an LLM and then vetted by one or more people to ensure the quality is sufficiently good. A suitable validation dataset may have at least a few dozen entries that each include a communication record and a corresponding summary. Once the validation dataset is established, the selecting, prompting, and filtering process can be performed to generate a suitable training data set that includes entries having a communication record and a corresponding summary.

To begin the process, a set of candidate communication records without corresponding summaries is identified. The set of communication records is then supplied to dataset generation software, which accesses the validation data set and, for each entry in the validation dataset, determines a similarity between each candidate communication record and the communication record in the validation dataset. Thus, each candidate communication record is compared against each communication record in the validation dataset. Any candidate communication record that is sufficiently similar to a communication record in the validation dataset is included in the candidate training dataset.

Once the candidate training dataset is created, the dataset generation software processes each communication record in the candidate training dataset to identify one or more similar communication records from the validation dataset. In this example, for each communication record in the candidate training dataset, the two most similar communication records from the validation dataset are identified. Any communication record that is not selected as being similar to any record in the validation data set can be removed from the training data set, though they may be retained in some cases.

The dataset generation software then generates an LLM prompt for each communication record in the candidate training dataset. In this example, the LLM prompt is a prompt to generate a summary of the communication record in the candidate training dataset and includes the two validation dataset entries, including both the communication records and the corresponding summaries. Thus, the prompt requests a summary of the communication record and provides the two entries from the validation dataset as examples for the LLM.

The LLM then generates a summary for the communication record and the dataset generation software evaluates the quality of the generated summary. If the summary is sufficiently good, the communication record and the corresponding summary are used to generate an entry in the LM training dataset. Otherwise, the communication record and the summary are discarded. This process is then repeated for all of the communication records in the candidate training dataset that have an associated communication record in the validation dataset to generate the LM training dataset. Once the LM training dataset is generated, it is used to train the LM to summarize communication records.

Using such a technique, an LLM can be used to help construct a training dataset for an LM to train it to perform a particular task, summarization in this example. This example technique allows a small validation dataset to help identify candidate training samples and generate suitable outputs that can be used to construct a training dataset for an LM. And while this example relates to summarization, such a technique may be used for other generative tasks as well, such as drafting emails or documents, generating images or video, generating audio, and so forth.

This illustrative example is given to introduce the reader to the general subject matter discussed herein and the disclosure is not limited to this example. The following sections describe various additional non-limiting examples and examples of distilling language models. To describe some implementations in greater detail, reference is first made to examples of hardware and software structures used to implement language models for summarization.

FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. Datacenters may be spread across various geographical locations. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application servers 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
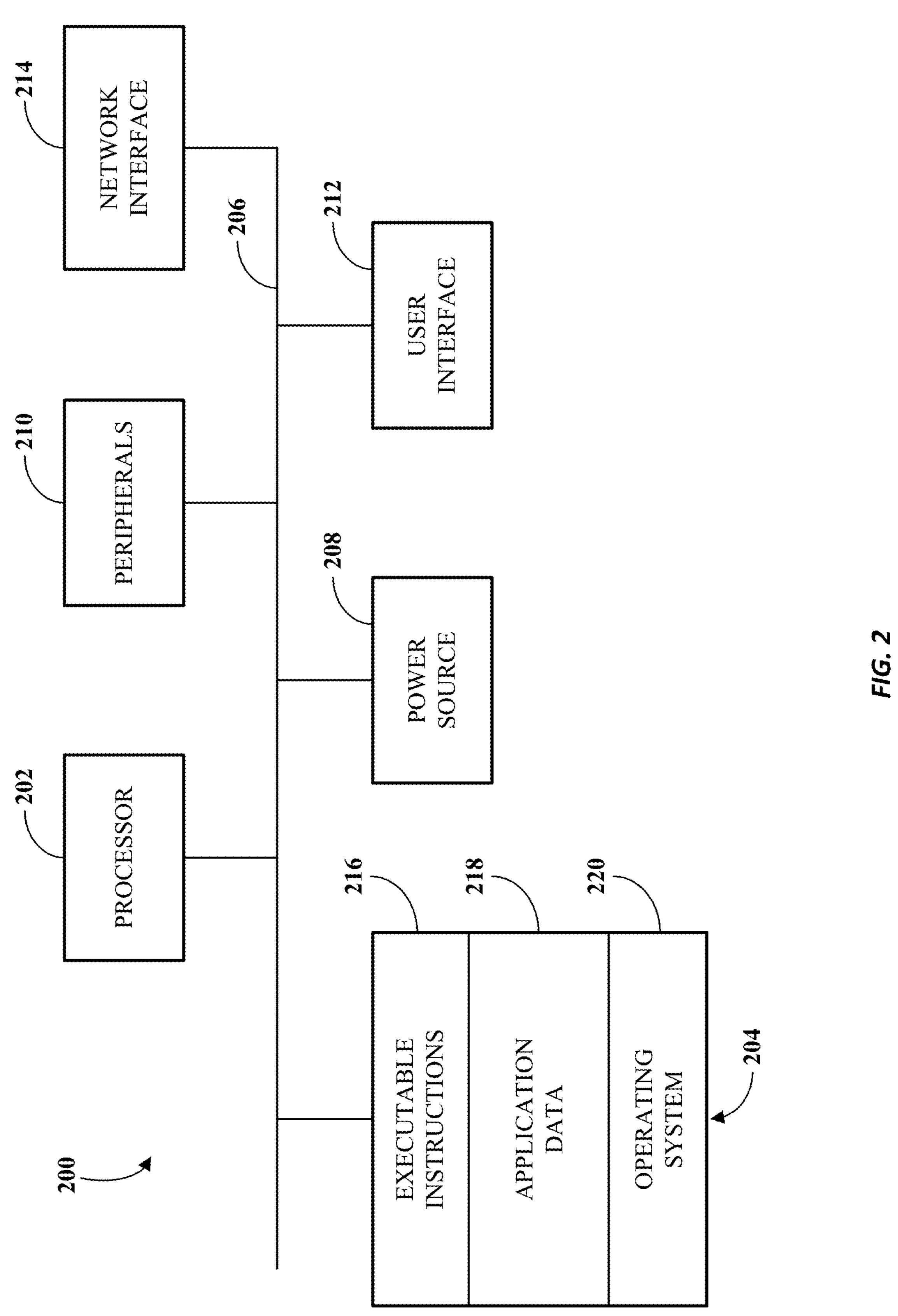
FIG. 2 is a block diagram of an example internal configuration of a computing device of an electronic computing and communications system suitable for use with example systems and methods for distilling language models according to this disclosure.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
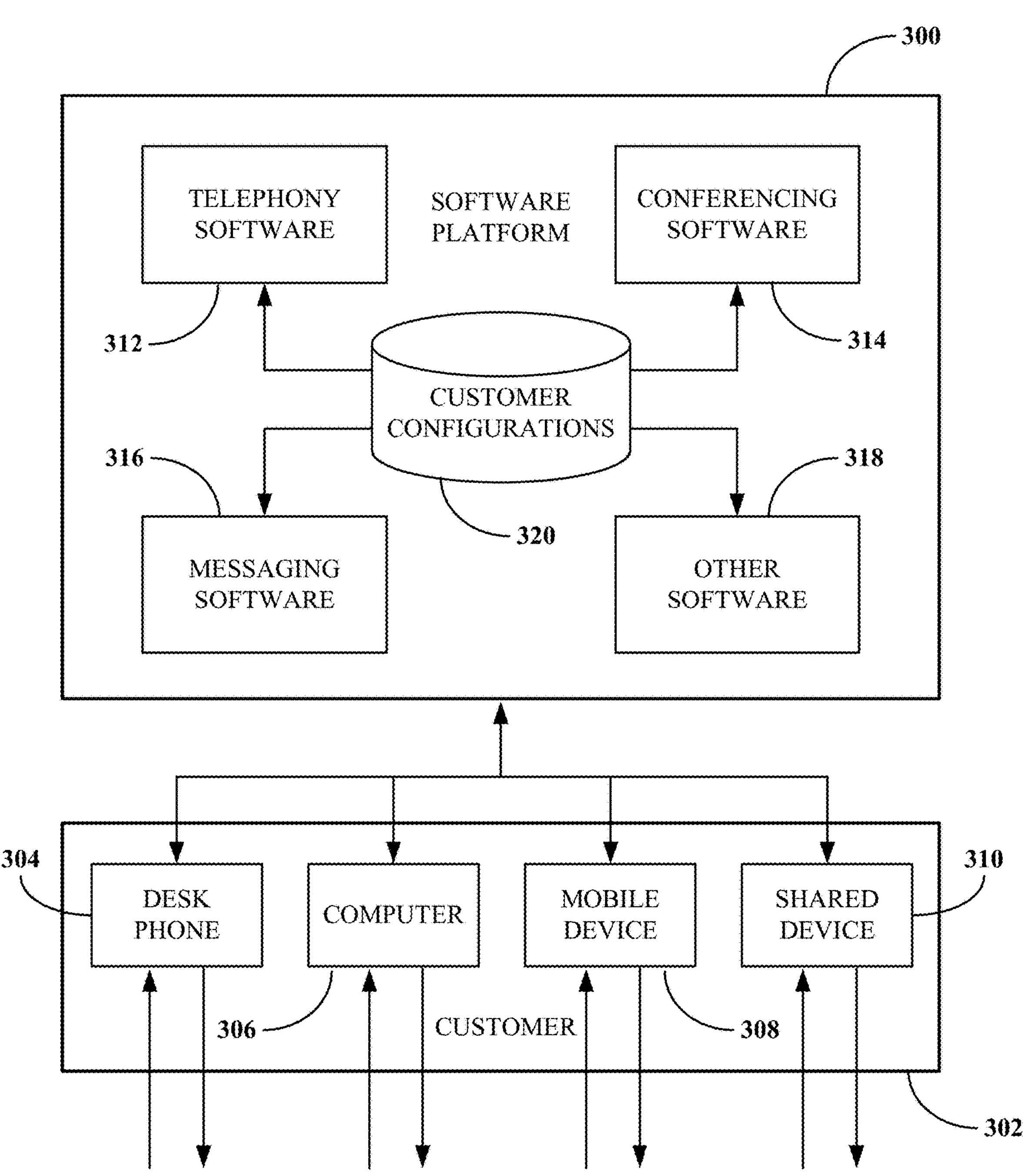
FIG. 3 is a block diagram of an example of a software platform implemented by an electronic computing and communications system suitable for use with example systems and methods for distilling language models according to this disclosure.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for summarization of conversations (e.g., transcripts of meetings) of data in the software platform 300.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
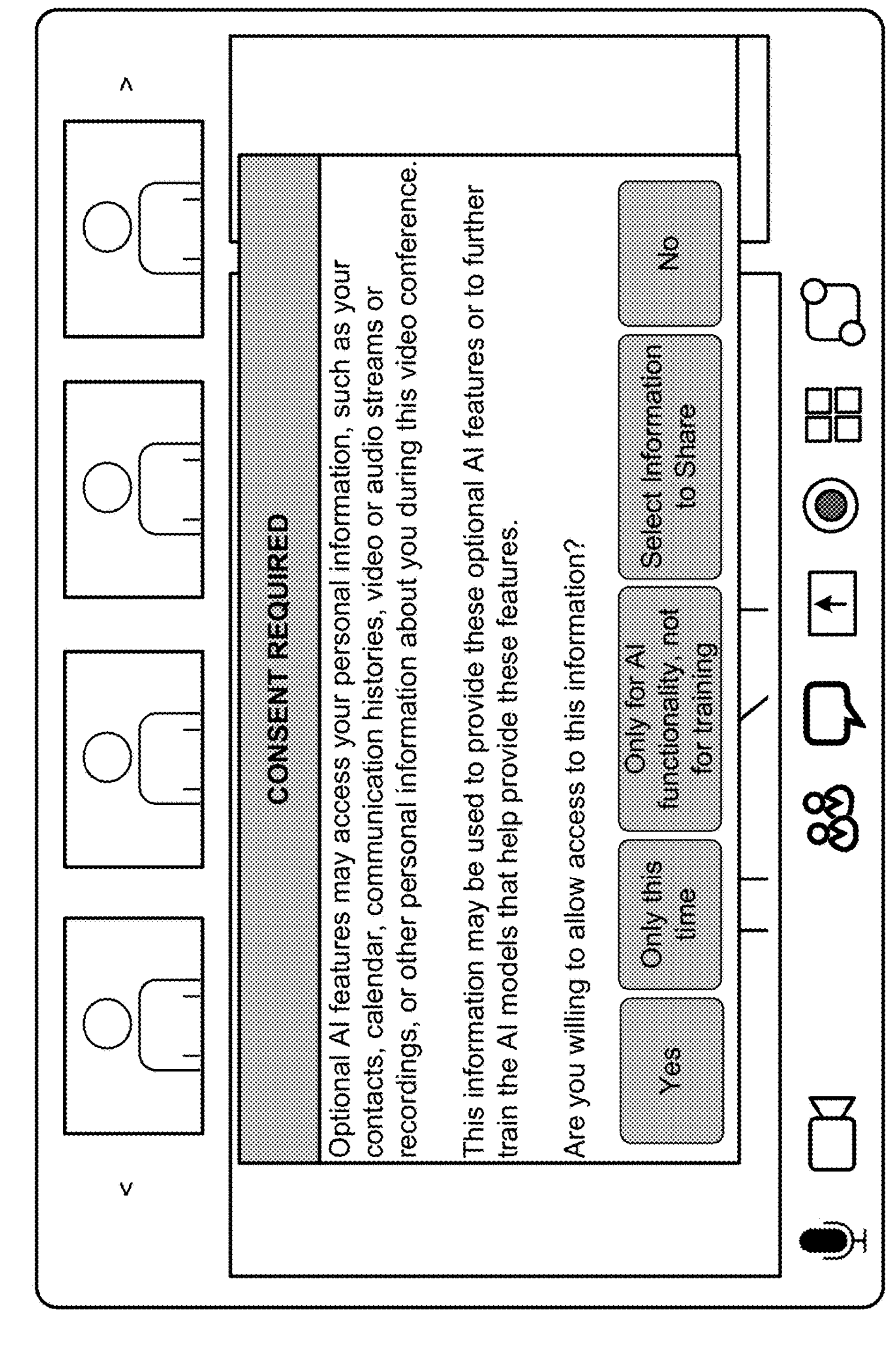
FIG. 4 is a graphical user interface ("GUI") suitable for use with example systems and methods for distilling language models according to this disclosure.

Referring now to FIG. 4, FIG. 4 shows a GUI 400 presenting a consent option to employ certain AI-assisted features. In some examples according to the present disclosure, a user may select an option to use one or more optional AI features available from the virtual conference provider, such as to train that AI functionality as described herein. The use of these optional AI features may involve providing the user's personal information to the AI models underlying the AI features. The personal information may include the user's contacts, calendar, communication histories, documents, video or audio streams, recordings of the video or audio streams, transcripts of audio or video conferences, or any other personal information available to the virtual conference provider. Further, the audio or video feeds may include the user's speech, which includes the user's speaking patterns, cadence, diction, timbre, and pitch; the user's appearance and likeness, which may include facial movements, eye movements, arm or hand movements, and body movements, all of which may be employed to provide the optional AI features or to train the underlying AI models.

Before capturing and using any such information, whether to provide optional AI features or to providing training data for the underlying AI models, the user may be provided with an option to consent, or deny consent, to access and use some or all of the user's personal information. In general, Zoom's goal is to invest in AI-driven innovation that enhances user experience and productivity while prioritizing trust, safety, and privacy. Without the user's explicit, informed consent, the user's personal information will not be used with any AI functionality or as training data for any AI model. Additionally, these optional AI features are turned off by default-account owners and administrators control whether to enable these AI features for their accounts, and if enabled, individual users may determine whether to provide consent to use their personal information.

As can be seen in FIG. 4, a user has engaged in a video conference and has selected an option to use an available optional AI feature. In response, the GUI has displayed a consent authorization window for the user to interact with. The consent authorization window informs the user that their request may involve the optional AI feature accessing multiple different types of information, which may be personal to the user. The user can then decide whether to grant permission or not to the optional AI feature generally, or only in a limited capacity. The user may entirely deny access to the user's personal information for any AI services, including for training any AI features, if they so desire. Alternatively, the user may select an option to only allow the AI functionality to use the personal information to provide the AI functionality, but not for training of the underlying AI models. In addition, the user is presented with the option to select which types of information may be shared and for what purpose, such as to provide the AI functionality or to allow use for training underlying AI models.

Figure 5A:
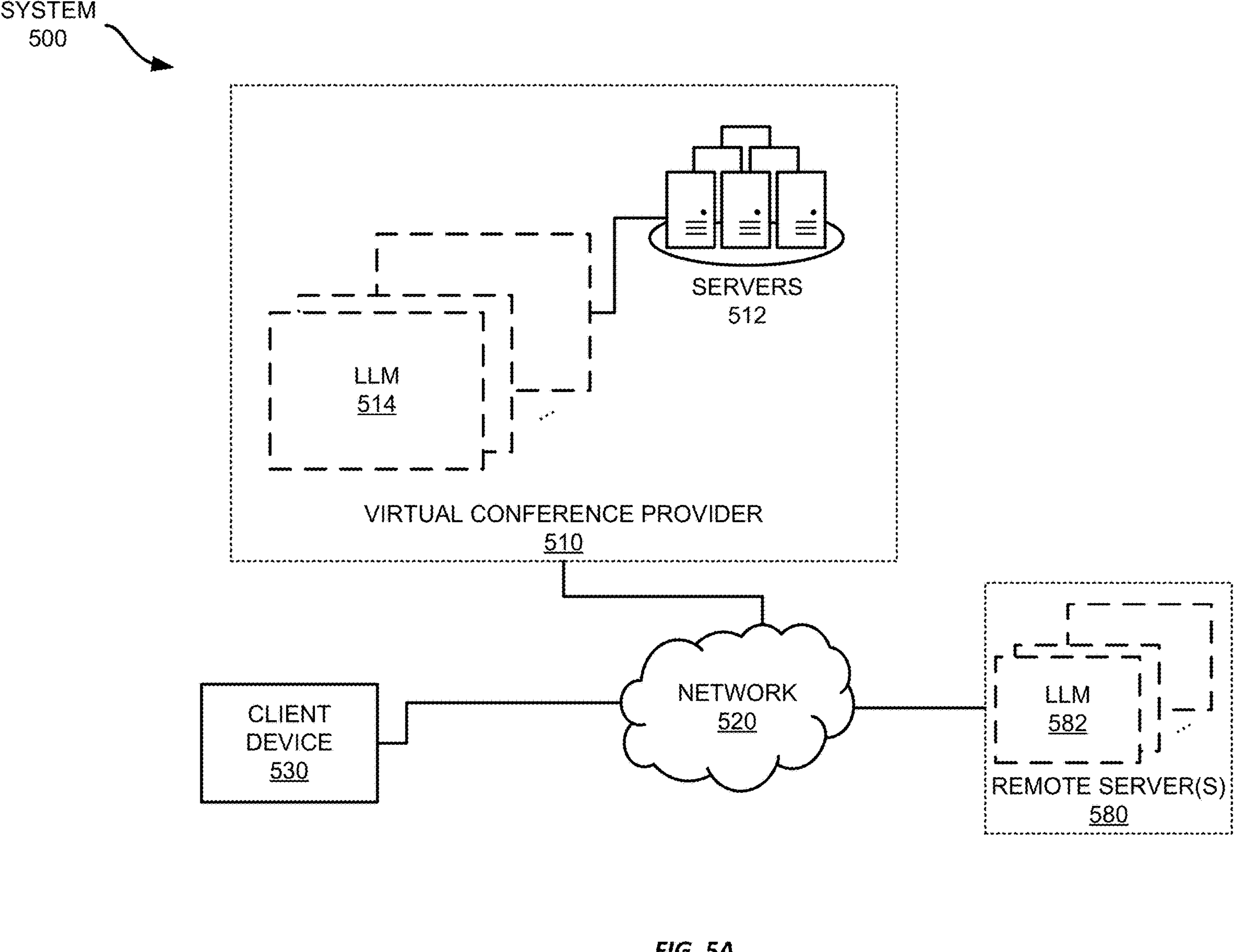
FIGS. 5A-5C are example systems for distilling a language model according to this disclosure.

Referring now to FIG. 5A, FIG. 5A shows an example system 500 for distilling LMs. In this example, the system 500 includes a client device 530, a virtual conference provider 510, and one or more remote servers 580 that host one or more LLMs 582. In this example, the virtual conference provider 510 provides virtual conferencing capabilities, such as discussed above with respect to FIGS. 1-2, but also provides one or more servers 512 that provide one or more general LLMs 514 that may be used to service requests received from users via their respective client device, such as client device 530. The general LLMs 514, 582 provided by the virtual conference provider 510 or remote server(s) 580 may include one or more LLMs to generate images, audio, video, or other content.

The general LLM in this case is an LLM 514, which has been trained on a large corpus of data, such as information available from licensed, commercially usable, non-public datasets. For general LLMs such as LLMs 514, 582, the training data may be written materials, such as webpages, documents, emails, or blogs that may be relevant to generating written works. For general LLMs trained to generate audio or video, large quantities of audio files or video files may be provided instead.

To obtain generated content from a general LLM 514, 582, a user of the client device 530 may interact with client software by typing in or speaking a description of the content to be generated by the general LLM 514, 582. The user may also indicate the type of content to be generated, such as text, an email, an agenda, a presentation deck, an audio message, a video, or audio-visual content. General LLMs 514, 582 may allow the user to include both a description of the desired content to be generated, but also certain constraints, such as the length of the content, specialized vocabulary that may be used, or a level of formality of the content (e.g., casual or professional). After submitting the request (or prompt) to the general LLM 514, 582, the general LLM 514, 582 will generate a response and provide it to the client software, which can then display it for the user.

Such functionality may be very helpful, however, a general LLM 514, 582 can have many billions of parameters, requiring tremendous memory and processing resources, which in turn consume large amounts of power. As more AI systems go into service at various entities, power consumption across an electrical grid can increase dramatically, stressing the electrical grid and power generation, generally. To help reduce the computing resources required to provide AI assistance, and thereby reduce power requirements, it may be possible to use smaller LMs, e.g., LMs having only a few million parameters, to handle tasks that can already be handled by LLMs. Though such smaller LMs may not be able to perform a broad range of AI-assisted functionality, they may still be highly capable at more discrete tasks. Thus, a virtual conference provider or other service provider may wish to create one or more different smaller LMs to provide AI-assisted functionality for common tasks, without the expense of providing one or more LLMs that may only be used for a fraction of their capabilities.

Figure 5B:
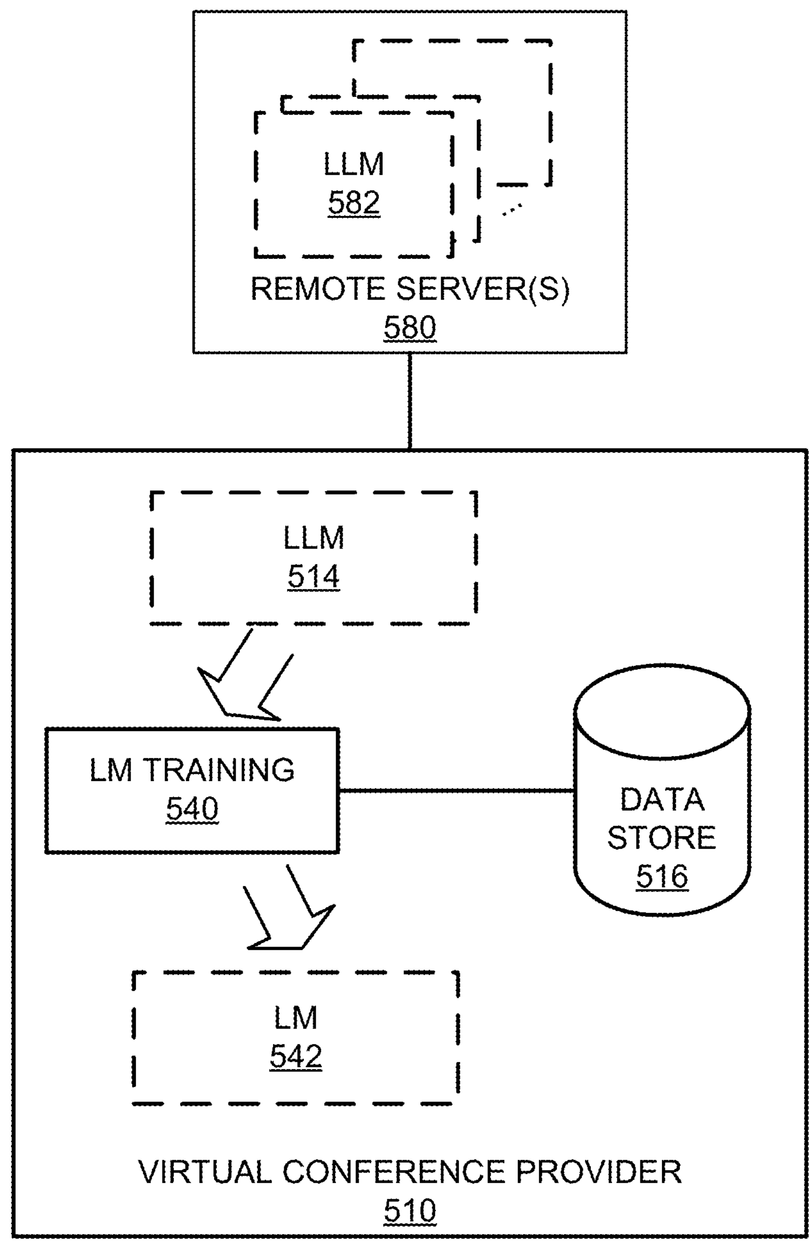

Referring now to FIG. 5B, FIG. 5B shows the virtual conference provider 510, which has implemented LM training functionality 540 that can be used to train a smaller LM 542 using a LLM 514, 582. In this example, the virtual conference provider 510 accesses a datastore 512 that has a training dataset for a particular type of functionality provided by an available LLM 514, 582 that can be used to train the LM. In addition, the datastore 512 stores other data that could be used as training data, but lacks corresponding labels to enable training. For example, a training dataset for summarization functionality may include text, such as meeting transcripts, documents, emails, or chat logs, as well as corresponding summaries of the text that provide suitable generated summarization output that can be used to help train the LM. Each pair of a text and a corresponding summary can be inputted to the LM as a part of the training process.

A difficulty with training an LM using such a training dataset is that while there may be an abundance of text available to be summarized (or otherwise used by an LLM to generate an output), most of these texts do not have summaries that can be used to help train an LM. Further, it can be a significant effort to manually summarize these texts to generate a training dataset. Further, while an LLM may be able to generate summaries of the texts, the generated summaries may vary in quality, depending on the subject matter of the text, the parameters provided to the LLM when generating the summary, or other variables.

To help ensure a high-quality dataset is available to train an LM to perform generative tasks, summarization for this example, the LM training functionality can access a corpus of available texts that lack corresponding summaries (referred to as "unannotated" communications or communication records) as candidates for a training dataset. It can then access a validation dataset stored in the datastore 516 that includes both texts and corresponding summaries of those texts. In addition, the texts and summaries in the validation set in this example have been manually reviewed and verified to be high-quality summaries of the respective text.

The LM training functionality 540 then compares the available unannotated communication records against the validation dataset to identify those unannotated communication records that are similar to entries in the validation dataset. Those that are similar to one or more entries in the validation set are saved to a set of candidate training samples. Once the candidate training samples have been identified, each candidate training sample is provided to an LLM along with a prompt to generate a summary of the training sample as well as two similar examples from the validation dataset to use as guides for the LLM. The LLM then generates a summary of the candidate training sample, which the LM training functionality 540 evaluates to determine whether it is a high-quality summary. If it is determined to be a high-quality summary, the training sample and the generated summary are saved together as a training sample in an LM training dataset. Once all of the training samples have been processed, the LM training functionality 540 can then use the LM training dataset to train an LM to generate summaries of text inputs.

Figure 5C:
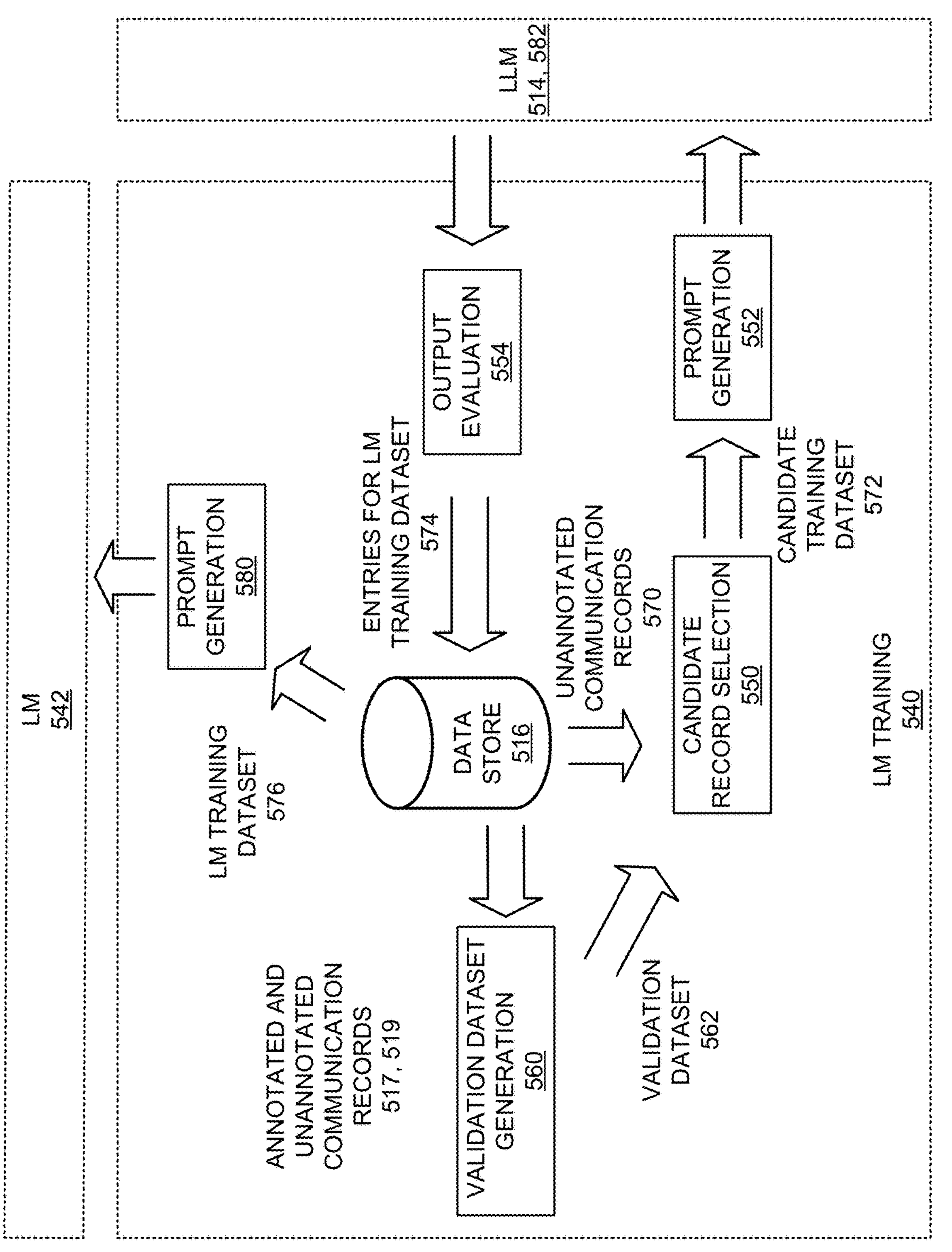

Referring now to FIG. 5C, FIG. 5C shows the LM training functionality 540 discussed above with respect to FIG. 5B. The LM training functionality 540 uses different functionalities to generate a suitable LM training dataset 576 that may be used to generate input prompts to train an LM 542. In this example, the LM training functionality 540 uses validation dataset generation 560 to generate a validation dataset of communication records 562. To then generate an LM training data set 576, it employs selection functionality to select candidate communication records 550, prompt generation functionality to generate input prompts to an LLM 514, 582 to generate summaries of unannotated candidate communication records 572, and output evaluation functionality 554 to evaluate the summaries generated by the LLM 514, 582 for inclusion in the LM training dataset 576. Once the LM training dataset 576 has been generated, the LM training functionality 516 uses prompt generation functionality 580 to generate input prompts to provide training data to an LM 542 to train it to perform text summarization. And while the description of the LM training functionality 540 will be in the context of text summarization, it can make use of this same approach to train an LM 542 to perform other generative tasks, such as to generate emails, documents, audio or video, images, or other content.

Initially, the LM training functionality 540 accesses a datastore 516 to obtain annotated communication records as candidates for a validation dataset. In this example, the annotated communication records are provided for human review to confirm the accuracy and quality of the annotations for the communication records. In this example, the communication records are text and the annotations are summaries of the text. However, in some examples the communication records may be prompts to generate content, such as a prompt to generate an email or an image, while the annotation may be the desired content corresponding to the prompt, such as the email or image. And while human review may be desirable, in some cases, the annotated communication records may be provided to an LLM 514, 582 to evaluate, such as to provide a score for the annotation based on the underlying communication record and the desired generative task. For example, the LLM 514, 582 may be prompted to evaluate the quality of a summary of the text, specifically considering accuracy and completeness, and then provide a score from 0 to 100. Annotated communication records that receive an evaluation score greater than a predetermined threshold, e.g., 90, may be selected for inclusion in a validation dataset.

Once a validation dataset is created, the LM training functionality 540 accesses one or more datastores, such as datastore 516, to obtain unannotated communication records. In this example, the communication records are text, such as meeting transcripts, chat logs, email messages, documents, and so forth. However, any sort of data may be used in different examples. Once a set of unannotated communication records 570 is obtained, the LM training functionality 540 selects records from the set of unannotated communication records 570 as candidate records for training an LM 542.

To select candidate records for inclusion in a candidate training set 572, the LM training functionality 540 determines a similarity between a subset of the unannotated communication records 570 and records in the validation dataset 562. In this example, the goal is to identify unannotated communication records that are similar to one or more records in the validation dataset 562 so that the validation dataset 562 can provide examples to the LLM 514, 582 regarding how to summarize the similar unannotated communication record.

To determine a similarity between an unannotated communication record and one or more records in the validation dataset, the candidate record selection functionality 540 generates embeddings for the unannotated communication record and the communication records in the validation dataset 562.

In this example, the service selection functionality 350 employs a trained AI model, such as a trained autoencoder, a trained predictor model, a deep averaging network that averages the embeddings of the words and bigrams and passes it through a feed-forward network, or any other variety of trained neural network, to generate embeddings for the unannotated communication record and the communication records in the validation dataset 562. The embeddings may be generated based on the entirety of a communication record, or multiple embeddings may be generated for each based on individual words, phrases, sentences, or other portions of the communication record. The embeddings are then used to select one or more similar records in the validation dataset 562. In this example, the candidate record selection functionality 550 analyzes each unannotated communication record embedding against the embeddings of the communication records in the validation dataset to determine a similarity score for the embeddings. In this example, the candidate record selection functionality 550 computes a cosine distance between the two embeddings to determine a similarity score.

And while the example shown in FIG. 3B employs binary embeddings, other techniques may be used to determine similarities between unannotated communication records 570 and communication records in the validation dataset 562. For example, rather than generating embeddings using a trained AI model, as discussed above, a cross-encoder may be provided with textual inputs representing the unannotated communication record and a communication record from the validation dataset 562. The cross-encoder then compares the two textual inputs to determine a similarity between them and outputs a score or confidence indicating the level of similarity, e.g., a value between 0 and 1. Thus, the candidate record selection functionality 550 could employ such a technique to identify communication records in the validation dataset that are sufficiently related to the unannotated communication record, e.g., the score satisfies a threshold such as 80% or 90%. And while these techniques represent some ways to determine relevancy for segments, others may be used. For example, the candidate record selection functionality 550 may employ an LLM to determine the similarity between an unannotated communication record and communication records in the validation dataset 562.

Once the similarities between the unannotated communication records 570 and the validation dataset 562 have been determined, the candidate record selection functionality 550 selects a suitable number of the unannotated communication records 570 to include in a candidate training dataset 572. In this example, for each record in the validation dataset 562, the candidate record selection functionality 550 selects up to a predetermined number of communication records that have a similarity to the respective record in the validation dataset 562 that satisfies a predetermined threshold. For example, the candidate record selection functionality 550 may select the top five unannotated communication records 570 that have a similarity score of 90% or greater for the respective communication record in the validation dataset 562. Ultimately, each record in the validation dataset 562 will have a corresponding set of similar unannotated communication records in the candidate training dataset. And while this example selects up to a predetermined number of similar unannotated communication records, such a limit is not required and so any number of unannotated communication records may be included in the candidate training dataset 572 based on a determined similarity to one or more communication records in the validation dataset 562.

Once the candidate training dataset 572 has been constructed, the LM training functionality 540 employs prompt generation functionality 552 to generate a prompt for the LLM 514, 582 to generate a summary of communication records in the candidate training dataset and that includes one or more examples from the validation dataset 562. In this example, the prompt generation functionality 552 selects a communication record from the candidate training dataset 572 and selects an entry in the validation dataset 562 based on a similarity between the selected communication record and the entry in the validation dataset 562. In this example, the similarity is determined as discussed above with respect to the candidate record selection functionality 550. Any suitable number of entries from the validation dataset 562 that are sufficiently similar to the selected communication record from the candidate training dataset 572 may be selected for inclusion as a part of the generated prompt. Once one or more similar entries from the validation dataset 562 have been selected, the prompt generation functionality 552 generates a prompt that instructs the LLM 514, 582 to generate a summary of the selected communication record from the candidate training dataset and to use the one or more selected entries from the validation dataset, including both the communication record and corresponding summary, as examples. For example, the prompt generation functionality 552 may generate a prompt according to a selected predefined template, such as according to the following format: "Generate a summary of [communication record from candidate training dataset 572]. Please generate the summary based on the following examples of inputs and corresponding summaries."

The LLM 514, 582 then generates a summary of the communication record from the candidate training dataset 572 and outputs it to the LM training functionality 540. The LM training functionality performs this same process for each entry in the candidate training dataset 572, thereby generating corresponding summaries for each communication record in the candidate training dataset 572.

The generated summaries and the corresponding communication records are provided to the output evaluation functionality 554 to evaluate the quality of the generated summary. In this example, the output evaluation functionality 554 determines a Shannon score based on the communication record from the candidate training dataset 572 and the corresponding generated summary. A Shannon score provides a reference-free summary evaluation metric that measures the difference in the ability of a language model to generate the communication record with and without the generated summary. Specifically, an LLM, such as GPT-2, determines the information difference, i.e., the difference between log probabilities of generating the communication record given the generated summary as the prompt and generating the communication record without it. The Shannon score is the ratio of this value to the information difference when the communication record itself is used as the summary. This assumes that the communication record conveys all of the information and thus the denominator becomes the upper bound of the information difference:

$$SS(C, S) = \frac{\log P(C|S) - \log P(C)}{\log P(C|C) - \log P(C)}$$

The Shannon score for a generated summary can then be compared to a predetermined threshold and, if the Shannon score satisfies the threshold, the communication record and the corresponding generated summary output as entries for the LM training dataset 574 and stored in the datastore 516. However, if the Shannon score does not satisfy the threshold, the summary may be regenerated with one or more additional similar examples from the validation dataset or the communication record and generated summary can be discarded and not included in the LM training dataset 576. Once all of the communication records in the candidate training dataset 572 have been processed, the LM training dataset 576 is complete.

When an LM is available for training, the LM training functionality 540 accesses the LM training dataset 576 in the datastore 516. The LM training functionality then employs prompt generation functionality 580 to generate input prompts to train the LM 542 based on the entries in the LM training dataset 576. In this example, the LM 542 has been pretrained and the LM training functionality 540 is used to fine-tune the LM 542 to perform text summarization. However, as discussed above, any suitable generative task may be trained based on an LM training dataset developed according to the same process. Thus, the LM training functionality 540 is able to train an LM 542 based on a generated LM training dataset 576.

While the LM 542 in this example is described as a prompt-based artificial neural network, in some examples, the LM may have a different architecture, such as an encoder-decoder model, which do not employ prompts as inputs. In such examples, the prompt-generation functionality 580 may instead provide inputs in other forms, such as binary embeddings or as raw text inputs without prompt phraseology. Thus, any suitable type of LM may be used according to different examples.

It should also be appreciated that while the discussion of the LM training functionality 540 was with respect to the virtual conference provider 510, the LM training functionality 540 may be performed by any suitable computing device, including the client device 530 or one or more of the remote servers 580.

Figure 6:
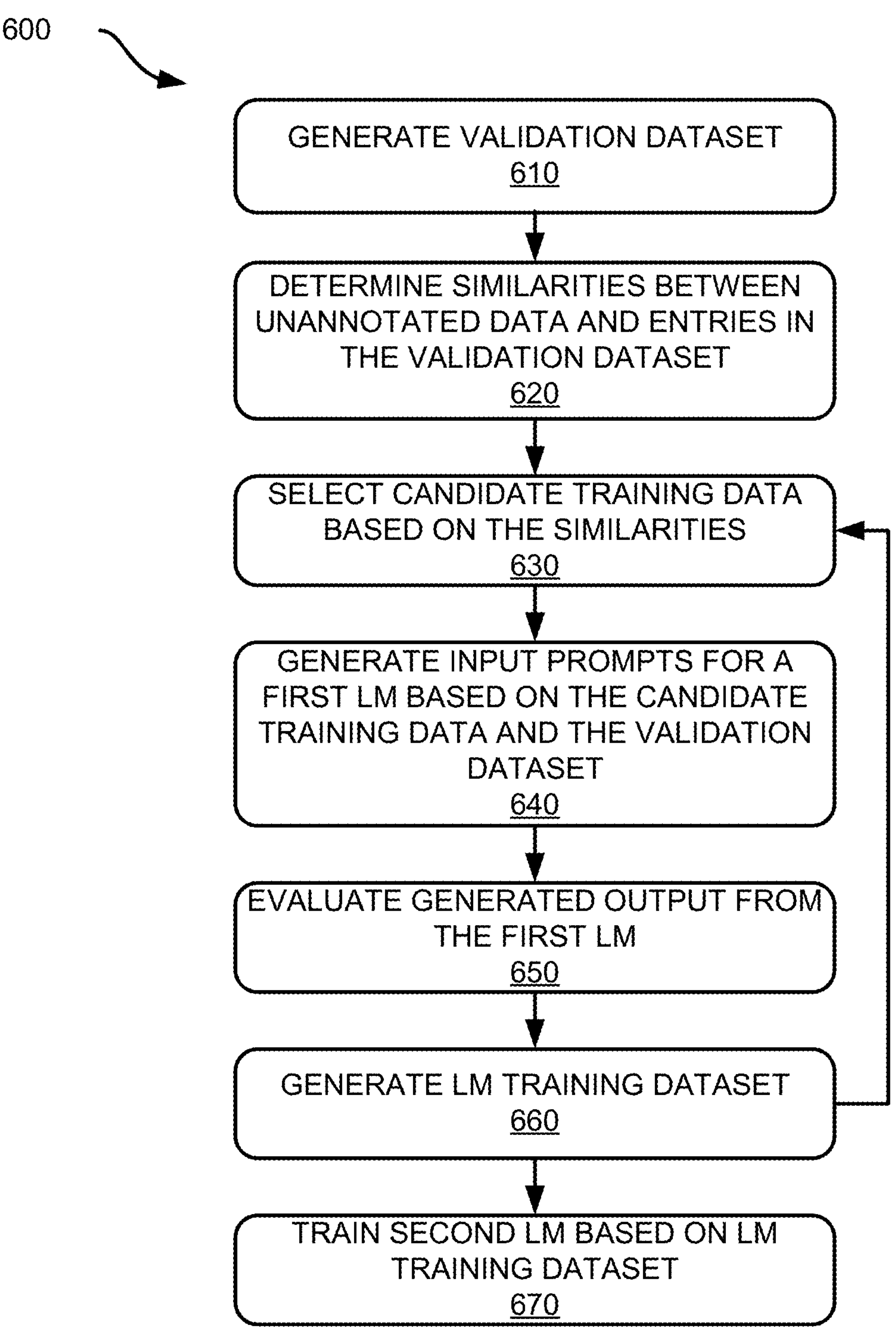
FIG. 6 shows an example method for distilling language models.

Referring now to FIG. 6, FIG. 6 shows an example method 600 for distilling language models. The example method will be described with respect to the example system 500 shown in FIGS. 5A-5C; however, it should be appreciated that any suitable system according to this disclosure may be employed. Further, while the system 500 discussed with respect to FIGS. 5A-5C is with respect to a virtual conference provider, any suitable computing system or service provider may be employed in other examples according to this disclosure.

At block 610, the LM training functionality 540 generates a validation dataset 562, generally as discussed above with respect to FIG. 5C. For example, a set of annotated communication records may be accessed and validated for accuracy and completeness. Any of the annotated communication records that are determined to be satisfactory, e.g., have a sufficiently good score or evaluation, may be included in the validation dataset 562. Once a threshold number of such annotated communication records are included in the validation dataset 562, it may be determined to be sufficiently large for use by the LM training functionality 540. In some cases, the LM training functionality 540 may present the annotated communications records to human reviewers for evaluation. In some cases, the LM training functionality 540 may evaluate the annotated communication records using the output evaluation functionality 554, discussed above with respect to FIG. 5C.

At block 620, the LM training functionality 540 determines similarities between unannotated data and entries in the validation dataset 562, generally as discussed above with respect to the candidate record selection functionality 550 in FIG. 5C. As discussed above, the LM training functionality 540 tries to identify unannotated data that is similar to entries in the validation dataset 562. Then the LM training functionality 540 provides similar examples to the LLM 514, 582 from the validation dataset 562 when it is asked to generate an annotation for the unannotated data. Part of the unannotated data that are most similar to the entries in the validation dataset 562 may be added to a candidate training dataset 572 that will be provided to LLM 514, 582 to generate the annotations.

At block 630, the LM training functionality 540 selects an entry from the validation dataset 562 based on a similarity to a communication record from the candidate training dataset 572, generally as discussed above with respect to the prompt generation functionality 552 in FIG. 5C. In this example, the LM training functionality 540 selects one entry from the validation dataset 562 that is sufficiently similar to the communication record from the candidate training dataset 572; however, any suitable number of sufficiently similar entries from the validation dataset 562 may be selected. For example, some examples may employ two entries from the validation dataset 562 as examples to include in a prompt to the LLM 514, 582.

At block 640, the LM training functionality 540 generates a prompt that includes the communication record from the candidate training dataset 572 and the one or more selected entries from the validation dataset 562. As discussed above, the LM training functionality 540 employs prompt generation functionality 552 to generate an input prompt to an LLM to generate an output based on the selected communication record from the candidate training dataset 572 as well the one or more selected entries from the validation dataset 562. For example, as discussed above, the prompt generation functionality 552 may employ a template prompt to cause the LLM 514, 582 to generate a summary of the communication record from the candidate training dataset 572 and to use the one or more entries from the validation dataset 562 as examples for how to generate the summary.

At block 650, the LM training functionality 540 receives an output from the LLM 514, 582 and evaluates the generated output generally as discussed above with respect to the output evaluation functionality 554 discussed above with respect to FIG. 5C. If the output is sufficiently high quality, the inputted communication record from the candidate training dataset 572 and the generated output may be combined and stored in a datastore 516 as an entry in the LM training dataset 576 at block 660. If the output is not of sufficiently high quality, The method 600 may return to block 630 to select another unannotated communication record from the candidate training dataset 572 or, if the LM training dataset has a sufficient number of entries, the method 600 may proceed to block 670.

At block 670, the LM training functionality 540 trains the LM 542 using the LM training dataset 576. In this example, the LM training functionality 540 uses prompt generation 580 to generate training prompts for the LM 542 to provide the entries from the LM training dataset 576 as training inputs to the LM 542. For example, the prompt generation 580 may employ a template that instructs the LM 542 to generate a summary of the communication record for an entry in the LM training dataset 572 and that the corresponding annotation provides an example of desired result, e.g., as a prompt/completion pair. The LM training functionality 540 may then progress through some or all of the entries in the LM training dataset 572 to train the LM 542 to perform the requested functionality. In this example, the LM 542 is trained to generate summaries of communication records; however, as discussed above, in some examples, the validation dataset 552, the candidate training dataset 572, and the LM training dataset 576 may include entries for other types of generative tasks, such as generating emails, calendar invitations, drafting emails or documents, generating images or video, generating audio, and so forth.

While the example method discussed above employs an LLM 514, 582 and an LM 542, it should be appreciated that any suitable LM may be used in place of the LLM 514, 582 or the LM 542, e.g., an LLM may be trained using such a technique, rather than an LM 542. Similarly, an LM 542, rather than an LLM 514, 582, may be used to generate outputs from prompts generated by prompt generation functionality 552 for communication records from the candidate training dataset 572.

One aspect of this disclosure is a method including selecting an entry from a validation set based on similarity to a first conversation, wherein the entry from the validation set includes a second conversation and a corresponding summary of the second conversation; generating a prompt that includes the first conversation, the second conversation, and the corresponding summary of the second conversation; inputting the prompt to a first language model to obtain a generated summary of the first conversation; and training a second language model for summarization based on the first conversation paired with the generated summary of the first conversation as a training example. In this aspect, similarity of the entry from the validation set to the first conversation may be determined based on a USE-cosine distance between the first conversation and the second conversation. In this aspect, the method may include selecting the first conversation from a corpus of conversations based on similarity to a conversation of an entry in the validation set. In this aspect, the first conversation may be one of multiple conversations from the corpus of conversations selected for inclusion in a training data set for the second language model based on USE-cosine similarity to a single entry in the validation set. In this aspect, the method may include filtering a set of training examples that each includes a conversation paired with a summary generated by the first language model to remove training examples with a Shannon Score below a threshold; and training the second language model using the filtered set of training examples. In this aspect, the method may include selecting a second entry from the validation set based on similarity to the first conversation, wherein the second entry from the validation set includes a third conversation and a corresponding summary of the third conversation; and wherein the prompt includes the third conversation and the corresponding summary of the third conversation. For example, this aspect could be implemented using other software 318 running on the application server 108.

One aspect of this disclosure is a system, including a processor and a memory, wherein the memory stores instructions executable by the processor to: select an entry from a validation set based on similarity to a first conversation, wherein the entry from the validation set includes a second conversation and a corresponding summary of the second conversation; generate a prompt that includes the first conversation, the second conversation, and the corresponding summary of the second conversation; input the prompt to a first language model to obtain a generated summary of the first conversation; and train a second language model for summarization based on the first conversation paired with the generated summary of the first conversation as a training example. In this aspect, similarity of the entry from the validation set to the first conversation is determined based on a USE-cosine distance between the first conversation and the second conversation. In this aspect, the memory may store instructions executable by the processor to select the first conversation from a corpus of conversations based on similarity to a conversation of an entry in the validation set. In this aspect, the first conversation is one of multiple conversations from the corpus of conversations selected for inclusion in a training data set for the second language model based on USE-cosine similarity to a single entry in the validation set. In this aspect, the memory may store instructions executable by the processor to filter a set of training examples that each includes a conversation paired with a summary generated by the first language model to remove training examples with a Shannon Score below a threshold; and train the second language model using the filtered set of training examples. In this aspect, the memory may store instructions executable by the processor to filter a set of training examples that each includes a conversation paired with a summary generated by the first language model to remove training examples with a Shannon Score below a threshold; and train the second language model using the filtered set of training examples. In this aspect, the memory may store instructions executable by the processor to selecting a second entry from the validation set based on similarity to the first conversation, wherein the second entry from the validation set includes a third conversation and a corresponding summary of the third conversation; and, wherein the prompt includes the third conversation and the corresponding summary of the third conversation. For example, this aspect could include the processor 202 and the memory 204, which may be components of the application server 108.

One aspect of this disclosure is a non-transitory computer-readable storage medium, comprising executable instructions that, when executed by a processor, facilitate performance of operations, including selecting an entry from a validation set based on similarity to a first conversation, wherein the entry from the validation set includes a second conversation and a corresponding summary of the second conversation; generating a prompt that includes the first conversation, the second conversation, and the corresponding summary of the second conversation; inputting the prompt to a first language model to obtain a generated summary of the first conversation; and training a second language model for summarization based on the first conversation paired with the generated summary of the first conversation as a training example. In this aspect, similarity of the entry from the validation set to the first conversation may be determined based on a USE-cosine distance between the first conversation and the second conversation. In this aspect, the operations may include selecting the first conversation from a corpus of conversations based on similarity to a conversation of an entry in the validation set. In this aspect, the first conversation may be one of multiple conversations from the corpus of conversations selected for inclusion in a training data set for the second language model based on USE-cosine similarity to a single entry in the validation set. In this aspect, the operations may include filtering a set of training examples that each includes a conversation paired with a summary generated by the first language model to remove training examples with a Shannon Score below a threshold; and training the second language model using the filtered set of training examples. In this aspect, the operations may include selecting a second entry from the validation set based on similarity to the first conversation, wherein the second entry from the validation set includes a third conversation and a corresponding summary of the third conversation; and wherein the prompt includes the third conversation and the corresponding summary of the third conversation. For example, this aspect could include other software 318 accessed by the application server 108.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:

fine-tuning a small language model, comprising:

accessing a set of communication records and a set of validation records;

for each communication record in the set of communication records, generating a first embedding representing the respective communication record;

for each validation record in the set of communication records, generating a second embedding representing the respective validation record;

for each communication record:

determining a similarity between the respective first embedding and each generated second embedding;

selecting a validation record from the set of validation records based on the determined similarities; and generating, using a large language model ("LLM"), a summary of the respective communication record comprising inputting the respective communication record and the validation record into the LLM; and training the small language model comprising prompting the small language model to generate a summary of a first communication record and providing the first communication record and the generated summary as a prompt/completion pair.

2. The method of claim 1, wherein the similarity is determined based on a cosine distance between the respective first embedding and the respective second embedding.

3. The method of claim 1, further comprising generating an unannotated training data set based on similarities between communication records in a superset of communication records and communication records in the set of validation records comprising:

for each communication record in the set of validation records:

determining a similarity between the communication record in the set of validation records and each communication record in the superset of communication records, and selecting the set of communication records from the superset of communication records based on the determined similarities; and wherein the respective communication record is obtained from the unannotated training data set.

4. The method of claim 3, wherein the similarity between the respective communication record in the set of validation records and each communication record in the superset of communication records is determined based on a cosine distance between an embedding generated from the respective communication record and embeddings generated from the communication records in the superset of communication records.

5. The method of claim 3, further comprising:

generating a summary of each communication record in the unannotated training data set based on similarities to one or more entries in the set of validation records; and generating an annotated training set based on the generated summaries and the corresponding communication records.

6. The method of claim 5, further comprising determining a Shannon score for each generated summary based on the respective communication record; and removing one or more communication records and corresponding summaries from the annotated training set based on generated summaries having Shannon scores that do not satisfy a Shannon score threshold to generate a filtered annotated training set.

7. The method of claim 6, further comprising training the small language model using the annotated training set.

8. The method of claim 1, further comprising:

selecting a second validation record from the set of validation records based on similarity to the respective communication record, wherein the second validation record from the set of validation records includes a third communication record and a corresponding summary of the third communication record; and wherein generating, using the LLM, the summary further comprises inputting the third communication record and the corresponding summary of the third communication record to the LLM.

9. A system comprising:

a non-transitory computer-readable medium; and one or more processors communicatively coupled to the non-transitory computer-readable medium, the one or more processors configured to execute processor-executable instructions stored in the non-transitory computer-readable medium to:

fine-tune a small language model, the one or more processors configured to execute processor-executable instructions configured to cause one or more processors to:

access a set of communication records and a set of validation records;

for each communication record in the set of communication records, generate a first embedding representing the respective communication record;

for each validation record in the set of communication records, generate a second embedding representing the respective validation record;

for each communication record:

determine a similarity between the respective first embedding and each generated second embedding;

select a validation record from the set of validation records based on the determined similarities; and generate, using a large language model ("LLM"), a summary of the respective communication record comprising inputting the respective communication record and the validation record into the LLM;

and train the small language model comprising prompting the small language model to generate a summary of a first communication record and providing the first communication record and the generated summary as a prompt/completion pair.

10. The system of claim 9, wherein the similarity is determined based on a cosine distance between the respective first embedding and the respective second embedding.

11. The system of claim 9, wherein the one or more processors are configured to execute further processor-executable instructions stored in the non-transitory computer-readable medium to:

generate an unannotated training data set based on similarities between communication records in a superset of communication records and communication records in the set of validation records;

for each communication record in the set of validation records:

determine a similarity between the communication record in the set of validation records and each communication record in the set of communication records, and select the set of communication records from the superset of communication records based on the determined similarities; and wherein the respective communication record is obtained from the unannotated training data set.

12. The system of claim 11, wherein the similarity between the respective communication record in the set of validation records and each communication record in the superset of communication records is determined based on a cosine distance between an embedding generated from the respective communication record and embeddings generated from the communication records in the superset of communication records.

13. The system of claim 11, wherein the one or more processors are configured to execute further processor-executable instructions stored in the non-transitory computer-readable medium to:

generate a summary of each communication record in the unannotated training data set based on similarities to one or more entries in the set of validation records; and generate an annotated training set based on the generated summaries and the corresponding communication records.

14. The system of claim 13, wherein the one or more processors are configured to execute further processor-executable instructions stored in the non-transitory computer-readable medium to:

determine a Shannon score for each generated summary based on the respective communication record; and remove one or more communication records and corresponding summaries from the annotated training set based on generated summaries having Shannon scores that do not satisfy a Shannon score threshold to generate a filtered annotated training set.

15. The system of claim 14, wherein the one or more processors are configured to execute further processor-executable instructions stored in the non-transitory computer-readable medium to train the small language model using the annotated training set.

16. The system of claim 9, wherein the one or more processors are configured to execute further processor-executable instructions stored in the non-transitory computer-readable medium to:

select a second validation record from the set of validation records based on similarity to the respective communication record, wherein the second validation record from the set of validation records includes a third communication record and a corresponding summary of the third communication record; and wherein generating, using the LLM, the summary further comprises inputting the third communication record and the corresponding summary of the third communication record to the LLM.

17. A non-transitory computer-readable medium comprising processor-executable instructions configured to cause one or more processors to:

fine-tune a small language model, comprising processor-executable instructions configured to cause one or more processors to:

access a set of communication records and a set of validation records;

for each communication record in the set of communication records, generate a first embedding representing the respective communication record;

for each validation record in the set of communication records, generate a second embedding representing the respective validation record;

for each communication record:

determine a similarity between the respective first embedding and each generated second embedding;

select a validation record from the set of validation records based on the determined similarities; and generate, using a large language model ("LLM"), a summary of the respective communication record comprising inputting the respective communication record and the validation record into the LLM; and train the small language model comprising prompting the small language model to generate a summary of a first communication record and providing the first communication record and the generated summary as a prompt/completion pair.

18. The non-transitory computer-readable medium of claim 17, further comprising processor-executable instructions configured to cause the one or more processors to:

generate an unannotated training data set based on similarities between communication records in a superset of communication records and communication records in the set of validation records;

for each communication record in the set of validation records:

determine a similarity between the communication record in the set of validation records and each communication record in the set of communication records, and select the set of communication records from the superset of communication records based on the determined similarities; and wherein the respective communication record is obtained from the unannotated training data set.

19. The non-transitory computer-readable medium of claim 18, further comprising processor-executable instructions configured to cause the one or more processors to:

generate a summary of each communication record in the unannotated training data set based on similarities to one or more entries in the set of validation records; and generate an annotated training set based on the generated summaries and the corresponding communication records.

20. The non-transitory computer-readable medium of claim 19, further comprising processor-executable instructions configured to cause the one or more processors to:

determine a Shannon score for each generated summary based on the respective communication record; and remove one or more communication records and corresponding summaries from the annotated training set based on generated summaries having Shannon scores that do not satisfy a Shannon score threshold to generate a filtered annotated training set.

* * * * *